(12) United States Patent
Seo

(10) Patent No.: US 9,152,014 B2
(45) Date of Patent: Oct. 6, 2015

(54) STEREOSCOPIC IMAGE PHOTOGRAPHING APPARATUSES AND METHODS

(75) Inventor: Hyeong-chan Seo, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 899 days.

(21) Appl. No.: 13/238,323

(22) Filed: Sep. 21, 2011

(65) Prior Publication Data
US 2012/0162389 A1 Jun. 28, 2012

(30) Foreign Application Priority Data
Dec. 23, 2010 (KR) ........................ 10-2010-0133713

(51) Int. Cl.
*G03B 9/36* (2006.01)
*G03B 35/04* (2006.01)
(52) U.S. Cl.
CPC . *G03B 9/36* (2013.01); *G03B 35/04* (2013.01)
(58) Field of Classification Search
CPC .................................. G03B 35/04; G03B 9/36
USPC .......................................................... 348/49
See application file for complete search history.

(56) References Cited

U.S. PATENT DOCUMENTS

| 2005/0175334 | A1* | 8/2005 | Lee ................................ 396/327 |
| 2006/0170785 | A1* | 8/2006 | Mashitani et al. ....... 348/211.99 |
| 2008/0225156 | A1* | 9/2008 | Kim .......................... 348/333.06 |
| 2012/0019736 | A1 | 1/2012 | Yamamoto et al. |

FOREIGN PATENT DOCUMENTS

| EP | 2 403 255 A2 | 1/2012 |
| WO | 2010/119923 A1 | 10/2010 |

OTHER PUBLICATIONS

Search Report established for GB 1121689.2 (Feb. 21, 2012).
Examination Report established for GB 1121689.2 (Oct. 1, 2013).
Office Action issued in related application CN 201110448492.7, Aug. 7, 2015, 14 pages.

* cited by examiner

*Primary Examiner* — Sath V Perungavoor
*Assistant Examiner* — Peter D Le
(74) *Attorney, Agent, or Firm* — Drinker Biddle & Reath LLP

(57) ABSTRACT

Example stereoscopic image photographing apparatuses and methods are disclosed. A disclosed example stereoscopic image photographing apparatus includes a shutter unit including a first region and a second region that are defined based on a gravity direction as an absolute basis regardless of an arrangement of the stereoscopic image photographing apparatus. A first image signal is generated by converting a first optical signal input through a first region of the shutter unit, and a second image signal is generated by converting a second optical signal input through the second region. In addition, a stereoscopic image is generated using the first image signal and the second image signal. Thus, a stereoscopic image with a difference between right and left views may be generated regardless of an orientation of the stereoscopic image photographing apparatus.

20 Claims, 14 Drawing Sheets

STEREOSCOPIC IMAGE PHOTOGRAPHING APPARATUSES AND METHODS

CROSS-REFERENCE TO RELATED PATENT APPLICATION

This application claims the priority benefit of Korean Patent Application No. 10-2010-0133713, filed on Dec. 23, 2010, in the Korean Intellectual Property Office, the entirety of which is incorporated herein by reference.

BACKGROUND

1. Field of the Invention

One or more aspects of the invention relate to stereoscopic image photographing apparatuses and methods.

2. Description of the Related Art

A three-dimensional image is characterized by a three-dimensional effect that allows a viewer to feel that he/she is seeing a three-dimensional object. In the past, such a three-dimensional effect was used in limited fields such as health care fields. However, recently, various visual media using three-dimensional images and three-dimensional television (TV) technologies for residential use have been developed.

In order to provide a three-dimensional image, two images that are substantially simultaneously captured at different angles need to be shown to the two eyes of a viewer, respectively. For example, a right image and left image may be generated by alternatively shutting optical paths of a left region and a right region using an iris or a shutter, and a stereoscopic image is generated using the right image and the left image.

However, a user may position a digital camera in various directions, not only in one direction, in order to capture images. When the digital camera is vertically positioned, the iris or the shutter alternately shuts the optical path of upper and lower regions, but does not shut an optical path of right and left regions. Thus, a stereoscopic image cannot be obtained when the digital camera is vertically positioned.

SUMMARY

One or more aspects of the invention provide stereoscopic image photographing apparatuses and methods for obtaining a stereoscopic image regardless of an orientation of the stereoscopic image photographing apparatuses.

According to an aspect of the invention, there is provided a stereoscopic image photographing apparatus including an optical unit for receiving an optical signal representing a subject; a shutter unit for alternately shutting a path of the optical signal in accordance with a first region and a second region; and an imaging unit for generating a first image signal by converting a first optical signal transmitted through the first region, and for generating a second optical signal by converting a second optical signal transmitted through the second region.

The shutter unit may divide the path of the optical signal into the first region and the second region based on a gravity direction.

According to another aspect of the invention, there is provided a method of capturing a stereoscopic image including detecting an orientation of a stereoscopic image photographing apparatus; dividing an optical path of the stereoscopic image photographing apparatus into first and second regions based on the orientation relative to a gravity direction; alternately shutting portions of the optical path in accordance with the first and second regions; generating a first image signal by converting a first optical signal transmitted through the first region; and generating a second optical signal by converting a second optical signal transmitted through the second region.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, stereoscopic image photographing apparatuses and methods will be described with regard to exemplary embodiments of the invention with reference to the attached drawings. According to one or more embodiments of the invention, a digital camera is exemplified as a stereoscopic image photographing apparatus, but one or more embodiments of the invention are not limited thereto. The stereoscopic image photographing apparatus may be any digital apparatus including a photographing device such as a cellular phone, a smart phone, a personal digital assistant (PDA), or the like.

Figure 1:
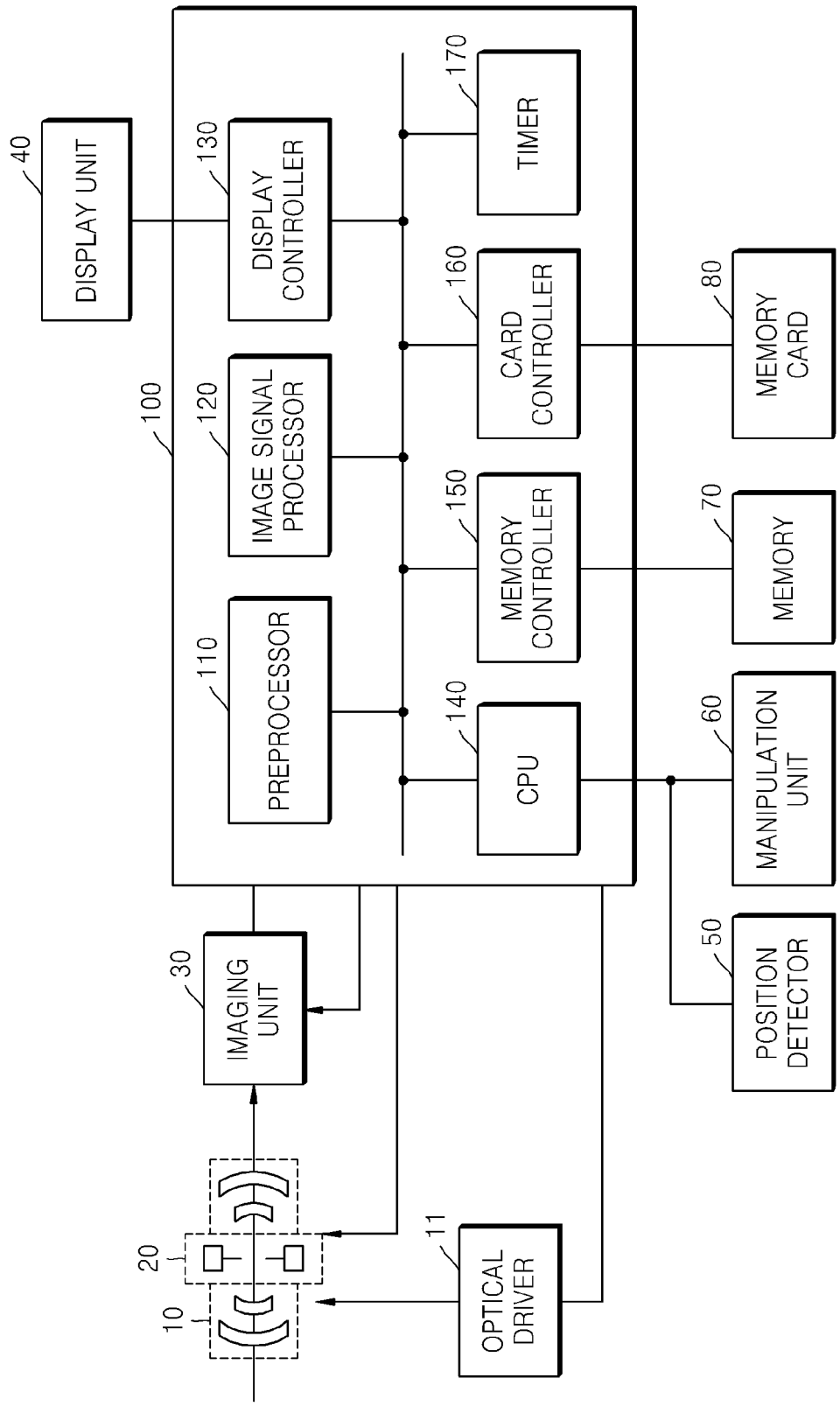
FIG. 1 is a block diagram of a stereoscopic image photographing apparatus, according to an embodiment of the invention.

FIG. 1 is a block diagram of a stereoscopic image photographing apparatus, according to an embodiment of the invention. According to the present embodiment, a digital camera is described as an example of the stereoscopic image photographing apparatus, but the present embodiment is not limited thereto. A digital device such as a camera phone, a PDA, a portable multimedia player (PMP), or a TV may also be used.

Referring to FIG. 1, the digital camera includes an optical unit 10 for receiving an optical signal representing a subject, a shutter unit 20 that includes a first region and a second region that can shut respective portions of a path of the optical signal, and an imaging unit 30 that can generate a first image signal by converting a first optical signal input through the first region, when the second region is shut, and can generate a second image signal by converting a second optical signal input through the second region, when the first region is shut.

The optical unit 10 may include a zoom lens for widening or narrowing a viewing angle according to a focal length of the optical unit 10, and a focus lens for focusing on the subject. Each of the zoom lens and the focus lens may be a single lens or a group of a plurality of lenses. The optical unit 10 may be driven by an optical driver 11 according to a control signal output from a digital signal processor (DSP)/central processing unit (CPU) 100. For example, the optical unit 10 may be controlled to adjust a position of the focus lens.

The shutter unit 20 may include an iris for adjusting an amount (optical amount) of the optical signal, and may include a shutter for controlling input of the optical signal. According to an embodiment of the invention, the shutter unit 20 may shut the path of the optical signal by controlling operations of the shutter. The shutter unit 20 may further include a shutter unit controller for opening and closing the iris. As described below, the shutter unit 20 may also change a position of the iris to enable stereoscopic images to be captured regardless of the orientation (e.g., horizontal or vertical) of the digital camera. In addition, the shutter unit 20 may include a controller for controlling opening of the shutter, or the like. According to the present embodiment, the shutter unit 20 is disposed in the center of the optical unit 10 since the path of the optical signal may be effectively shut by disposing the shutter unit 20 in a portion where the optical signal is concentrated. However, the present embodiment is not limited to this. The shutter unit 20 may be disposed in front of or behind the optical unit 10.

The imaging unit 30 receives the optical signal input through the optical unit 10 and the shutter unit 20 so as to form an image of the subject. The imaging unit 30 may include an imaging device such as a complementary metal oxide semiconductor (CMOS) sensor array, a charge coupled device (CCD) sensor array, or the like. In addition, the imaging unit 30 may include a correlated double sampling/amplifier (CDS/AMP) for removing a low-frequency noise contained in an electrical signal output from the CCD sensor array and amplifying the electrical signal to a predetermined level. The imaging unit 30 may further include an analog-to-digital (A/D) converter for generating a digital signal by converting the electrical signal output from the CDS/AMP. According to the present embodiment, the A/D converter, or the like together with the imaging device is included in the imaging unit 30, but the present embodiment is not limited thereto. For example, the A/D converter may be configured as a separate device, or alternatively may be included in the DSP/CPU 100.

The DSP/CPU 100 may include a preprocessor 110, an image signal processor 120, a display controller 130, a CPU 140, a memory controller 150, a card controller 160, a timer 170, etc.

The preprocessor 110 receives the image signal generated by the imaging unit 30 and calculates an auto white balance (AWB) estimation value for adjusting white balance, an auto exposure (AE) estimation value for adjusting exposure, and a focal point estimation value for adjusting a focal point.

The image signal processor 120 may reduce noise in input image data and may perform image signal processing such as gamma correction, color filter array interpolation, color matrix, color correction, or color enhancement. The image signal processor 120 may detect a subject region according to a subject recognition algorithm from the image signal, or may perform image-processing such as scene recognition according to a scene recognition algorithm. In more detail, a face region may be detected according to a face recognition algorithm. In addition, the image signal processor 120 performs compression and extension on the image signal on which image signal processing is performed. For example, the image signal may be compressed in accordance with a joint photographic experts group (JPEG) format, an H.264 format, or the like. An image file containing the image data generated by the compression is stored in a memory card 80 through the card controller 160. In addition, the image signal processor 120 may perform decompression and image-processing for displaying an image.

The display controller 130 controls output of an image displayed on a display unit 40. The display unit 40 may include an electronic viewfinder (EVF), and a display device for displaying a preview image. The display unit 40 may be an organic light-emitting device (OLED), a liquid crystal display device (LCD), or the like.

The CPU 140 controls overall operations of each unit. The CPU 140 may control an operation corresponding to a user's manipulation signal input through a manipulation unit 60. In addition, the CPU 140 may perform an operation corresponding to a signal detected by a position detector 50 for detecting a position of the digital camera such as, for example, a match direction or an orientation (e.g., vertical or horizontal). Each component may be controlled according to an algorithm that is previously stored according to the manipulation signal, the detection signal, or the like.

The position detector 50 may be a 6-axis gravity sensor.

The memory controller 150 controls a memory 70 for temporally storing data such as a captured image or associated information.

The timer 170 measures time.

Hereinafter, operations of the DSP/CPU 100 will be described.

When a manipulation signal (e.g., a shutter half-press, full-press or release) is input to the CPU 140 from the manipulation unit 60, the CPU 140 operates the imaging unit 30. In detail, the CPU 140 outputs a timing signal to an imaging device controller of the imaging unit 30 so as to operate its imaging device. When the image signal is input to the preprocessor 110 from the imaging unit 30, at least one calculation from among AWB, AE, and auto focus (AF) is performed. The calculation results of AWB, AE, and AF may be transmitted to the imaging device controller as feedback to obtain an image signal with appropriate color output, appropriate focus and appropriate exposure from the imaging device.

When a photographic operation of the digital camera is started, a live view image may be displayed. The image signal is applied to the image signal processor 120, and image signal processing such as pixel interpolation for displaying the live view image may be performed. The image signal on which the image signal processing is performed is displayed on the display unit 40 through the display controller 130 so as to display the live view image. The live view image may be updated at a frequency of 60 frames per second (fps), but is not limited thereto, and may be updated at a frequency of 120 fps, 180 fps, 240 fps, or the like. The updating frequency may be set by the CPU 140, based on a measurement result or AF condition, and may be adjusted according to the timing signal.

When a shutter-release button is half-pressed, the CPU 140 detects a signal S1 corresponding to the half-pressed motion, and instructs driving of the focus lens of the optical unit 10 in order to perform an AF operation. In addition, when the CPU 140 detects the signal S1 corresponding to half-pressed motion, the CPU 140 controls the driving of the focus lens in order to perform the AF operation.

When the shutter-release button of the manipulation unit 60 is half-pressed to enter a state S1, the preprocessor 110 calculates at least one of an AF estimation value, an AE estimation value, and an AWB estimation value of an input image signal. According to the calculated estimation values, AF, AE and AWB operations corresponding to the calculated estimation values may be performed. A user may be notified about the performance results through icon images, audio signals, or the like. In addition, in the state S1, various application operations such as subject recognition or scene recognition may be performed.

When the shutter-release button is fully-pressed to enter a state S2, an image is captured in a photographing condition according to the pre-processing. Required image-quality improvement from among the image processing may be performed on the captured image. Then, the captured image may be compressed to obtain an image file and the image file may be stored in the memory 70 or on the memory card 80. The image file stored in the memory 70 may be decompressed so as to be reproduced on the display unit 40.

Figure 2:
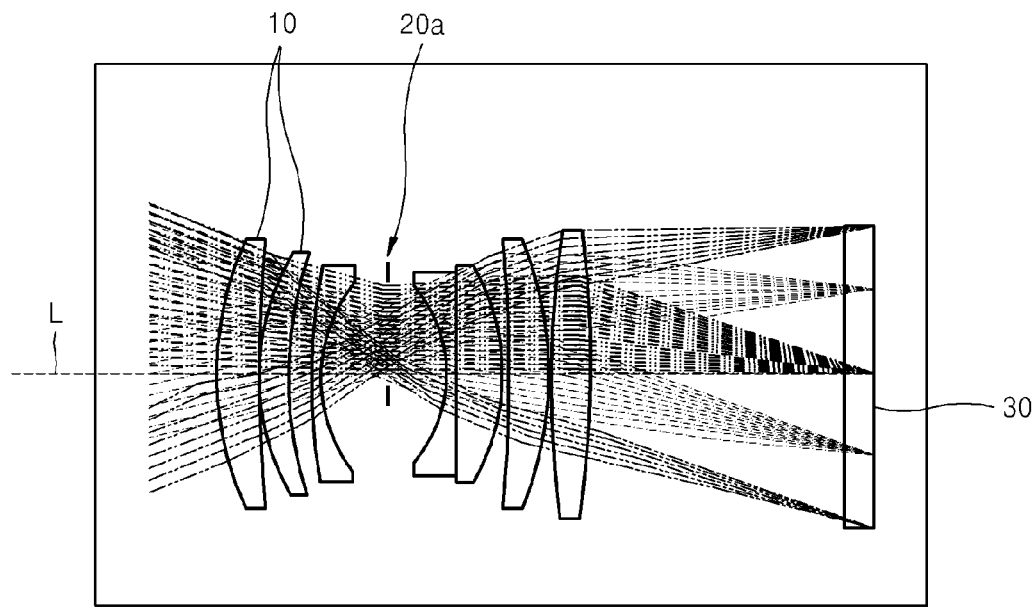
FIGS. 2 and 3 are diagrams for describing an operation of generating a stereoscopic image in a stereoscopic image photographing apparatus, according to an embodiment of the invention.
Figure 3:
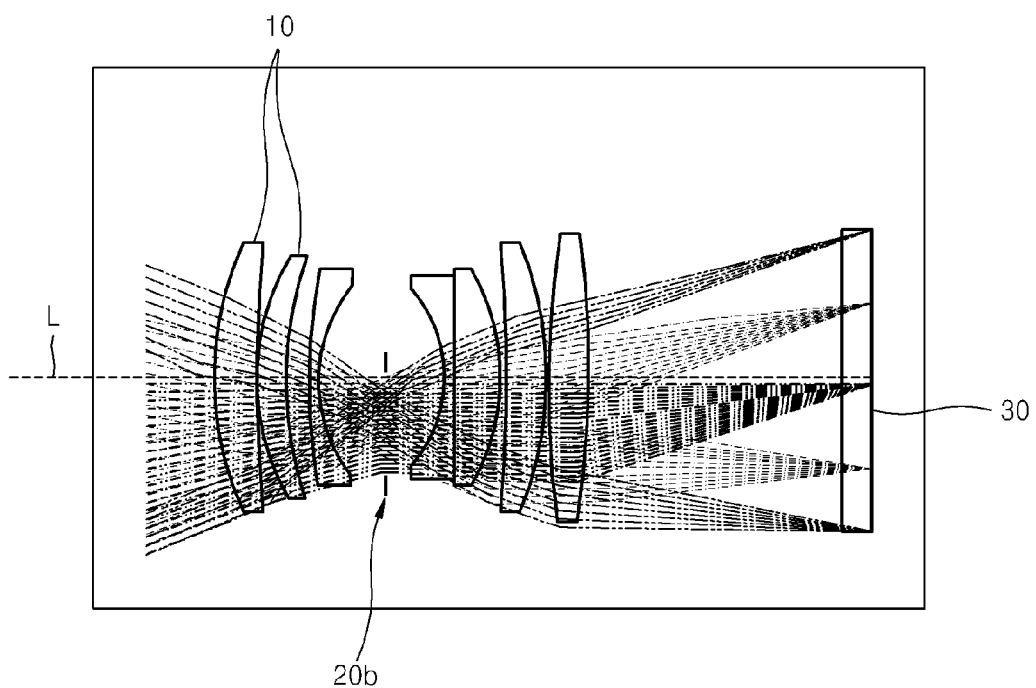

FIG. 2 is a conceptual diagram for describing a path of a first optical signal input through a first region 20a of a shutter unit (e.g., the shutter unit 20 of FIG. 1) during a stereoscopic image photographing operation of a stereoscopic image photographing apparatus, according to an embodiment of the invention. FIG. 3 is a conceptual diagram for describing a path of a second optical signal input through a second region 20b of the shutter unit, according to an embodiment of the invention.

In detail, when the shutter unit is divided into a first side and a second side relative to an optical axis L based on a gravity direction, FIG. 2 shows a case where a first image signal is generated on the imaging unit 30 from the first optical signal transmitted through the first region 20a corresponding to the first side. FIG. 3 shows a case where a second image signal is generated on the imaging unit 30 from the second optical signal transmitted through the second region 20b corresponding to the second side. When the shutter unit is oriented horizontally (e.g., perpendicular to the gravity direction), the first region 20a is a left region, and the second region 20b is a right region.

Using the first image signal and the second image signal, a first image corresponding to the first image signal and a second image corresponding to the second image may be formed on right and left eyes of a user who views a stereoscopic image at different angles corresponding to the right and left eyes, thereby making the stereoscopic image smooth.

Figure 4:
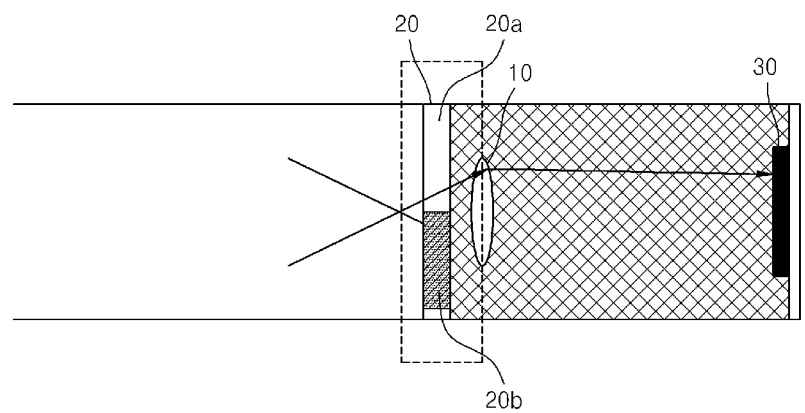
FIG. 4 is a conceptual diagram for describing a case where a shutter is driven in a stereoscopic image photographing apparatus, according to an embodiment of the invention.

FIG. 4 is a conceptual diagram for describing a case where, when the shutter unit 20 is divided into a first region 20a and a second region 20b, an optical signal is transmitted through the first region 20a so as to form an image on the imaging unit 30 through the optical unit 10, in a digital camera as a stereoscopic image photographing apparatus, according to an embodiment of the invention.

Figure 5:
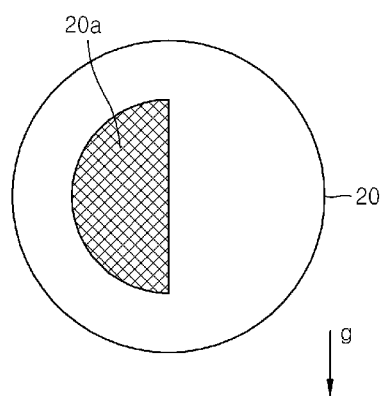
FIG. 5 is a conceptual diagram for describing a shutting operation of an optical signal in a first region of a shutter unit, in a digital camera as a stereoscopic image photographing apparatus, according to an embodiment of the invention.
Figure 6:
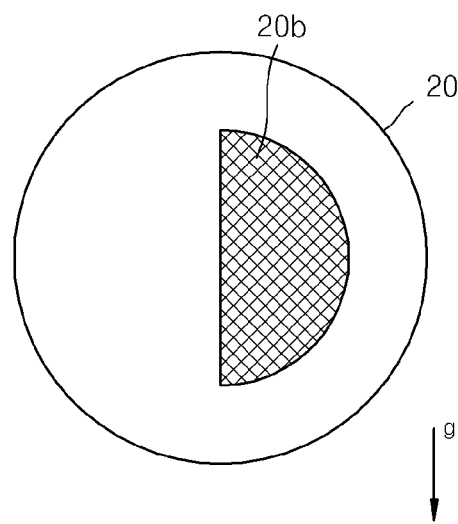
FIG. 6 is a conceptual diagram for describing a shutting operation of an optical signal in a second region of a shutter unit, in a digital camera as a stereoscopic image photographing apparatus, according to an embodiment of the invention.

FIG. 5 is a conceptual diagram for describing a shutting operation of an optical signal in the first region 20a of the shutter unit 20, in a digital camera as a stereoscopic image photographing apparatus, according to an embodiment of the invention. FIG. 6 is a conceptual diagram for describing a shutting operation of an optical signal in the second region 20b of the shutter unit 20, in a digital camera as a stereoscopic image photographing apparatus, according to an embodiment of the invention. As described below, the first region 20a and the second region 20b are regions divided based on a gravity direction g into right and left sides.

In the stereoscopic image photographing apparatus, according to one or more embodiments of the invention, regardless of a position (e.g., orientation) of a digital camera, that is, the stereoscopic image photographing apparatus, the shutter unit 20 is divided into the first region 20a and the second region 20b based on the gravity direction g, which will be described with reference to FIGS. 7 through 11.

Figure 7:
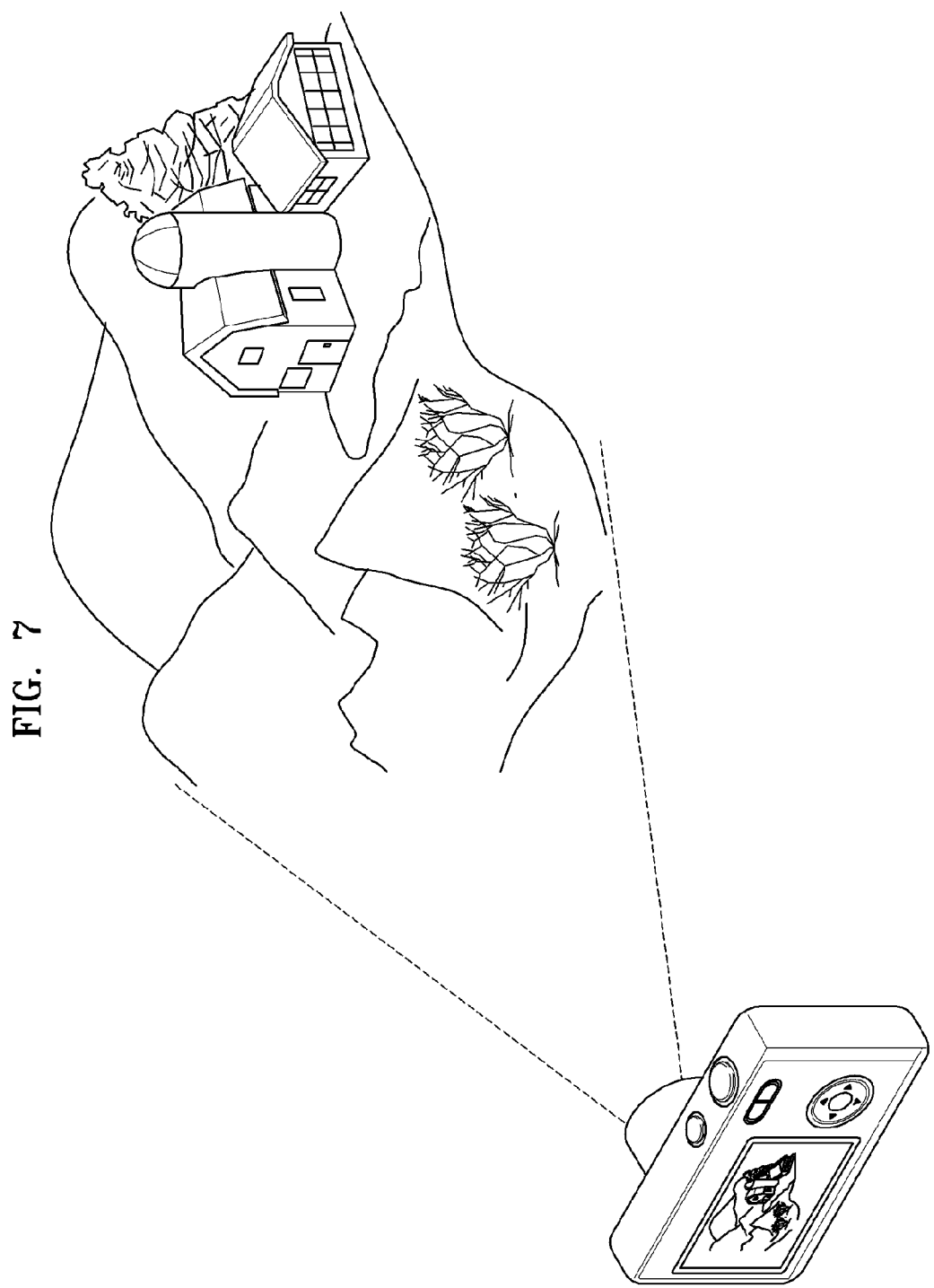
FIG. 7 is a diagram for describing a photographing operation when a stereoscopic image photographing apparatus is horizontally positioned, according to an embodiment of the invention.

FIG. 7 is a diagram for describing a photographing operation when a stereoscopic image photographing apparatus is horizontally positioned (e.g., oriented), according to an embodiment of the invention. As an example, in order to photograph a scene, a digital camera is horizontally positioned. A position detector (e.g., the position detector 50 of FIG. 1) may detect whether the digital camera is horizontally or vertically positioned. The position detector may be a 6-axis gravity sensor.

Figure 8:
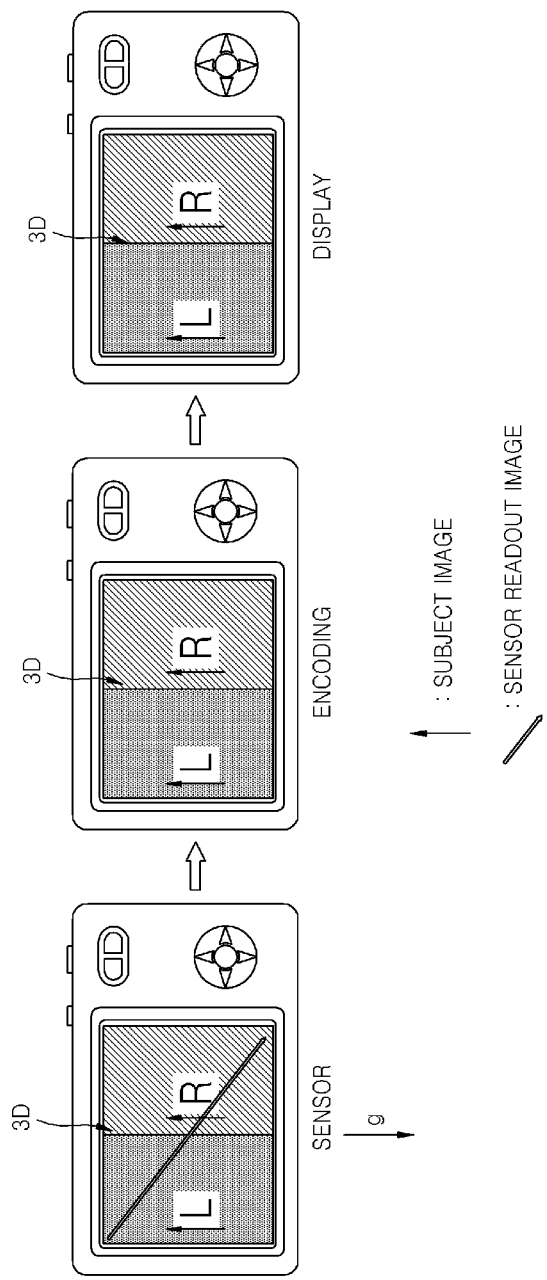
FIG. 8 is a diagram for describing a case where an image read from a sensor is compressed and the image is displayed on a display unit when the digital camera is horizontally positioned, as shown in FIG. 7, according to an embodiment of the invention.

FIG. 8 is a diagram for describing a case where an image read from an imaging device (e.g., of the imaging unit 30 of FIG. 1) is compressed and the image is displayed on a display unit (e.g., the display unit 40 of FIG. 1), when the digital camera is horizontally positioned, as shown in FIG. 7, according to an embodiment of the invention.

In detail, with reference to FIG. 8 together with FIGS. 4 through 6, when the digital camera is horizontally positioned in order to capture an image, a first image corresponding to the first optical signal transmitted through the first region 20a of the shutter unit 20 is captured by the imaging device so as to form a left image L in which a subject is positioned in a right direction (↑). In addition, a second image corresponding to the second optical signal transmitted through the second region 20b of the shutter unit may be captured by the imaging device so as to form a right image R in which the subject is positioned in a left direction (↑). The left image L and the right image R are alternately displayed so as to generate a difference between right and left views, thereby obtaining a stereoscopic image 3D. Hereinafter, for convenience of description, the stereoscopic image 3D is an image formed by displaying the left image L and the right image R together, as shown in FIG. 8. The left image L and the right image R generated by the imaging device are read in a readout direction, as depicted in FIG. 8.

In addition, the stereoscopic image 3D in which the subject is positioned in the right direction (↑) may be encoded and may be displayed.

Figure 9:
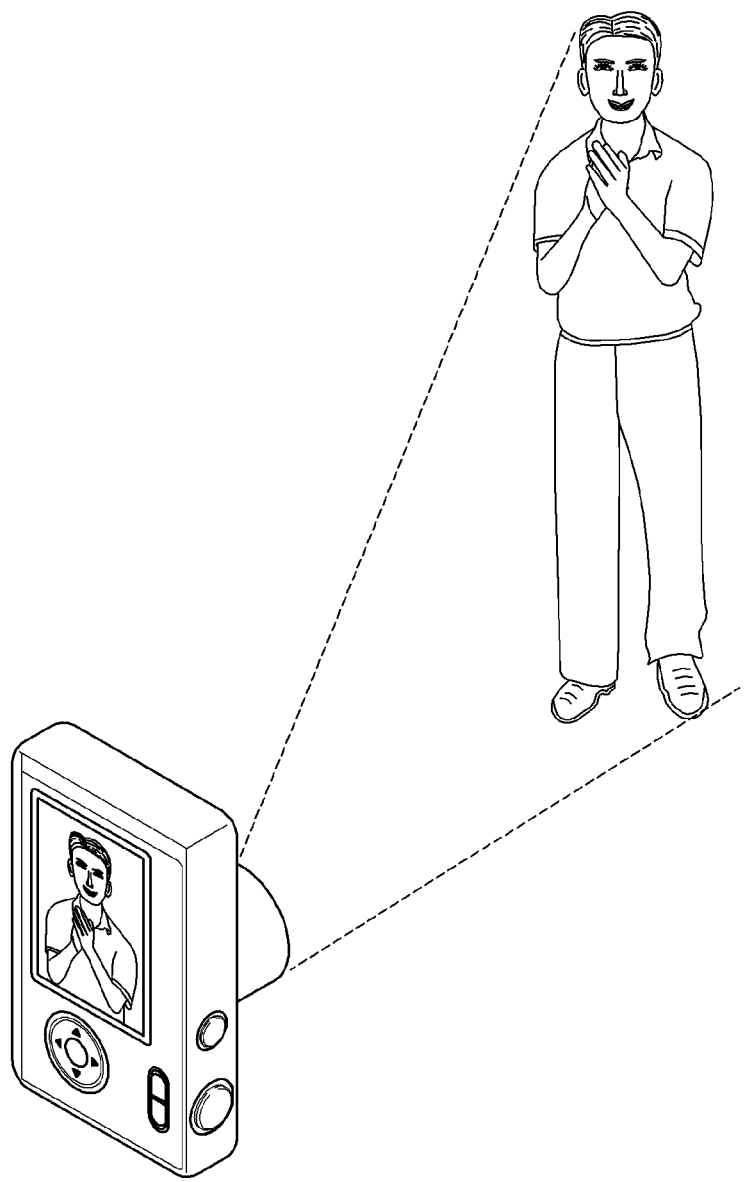
FIG. 9 shows a case where a digital camera is vertically positioned in order to capture an image.

FIG. 9 shows a case where a digital camera is vertically positioned in order to capture an image. As an example, the digital camera is vertically positioned in order to photograph a person, according to an embodiment of the invention.

Figure 10:
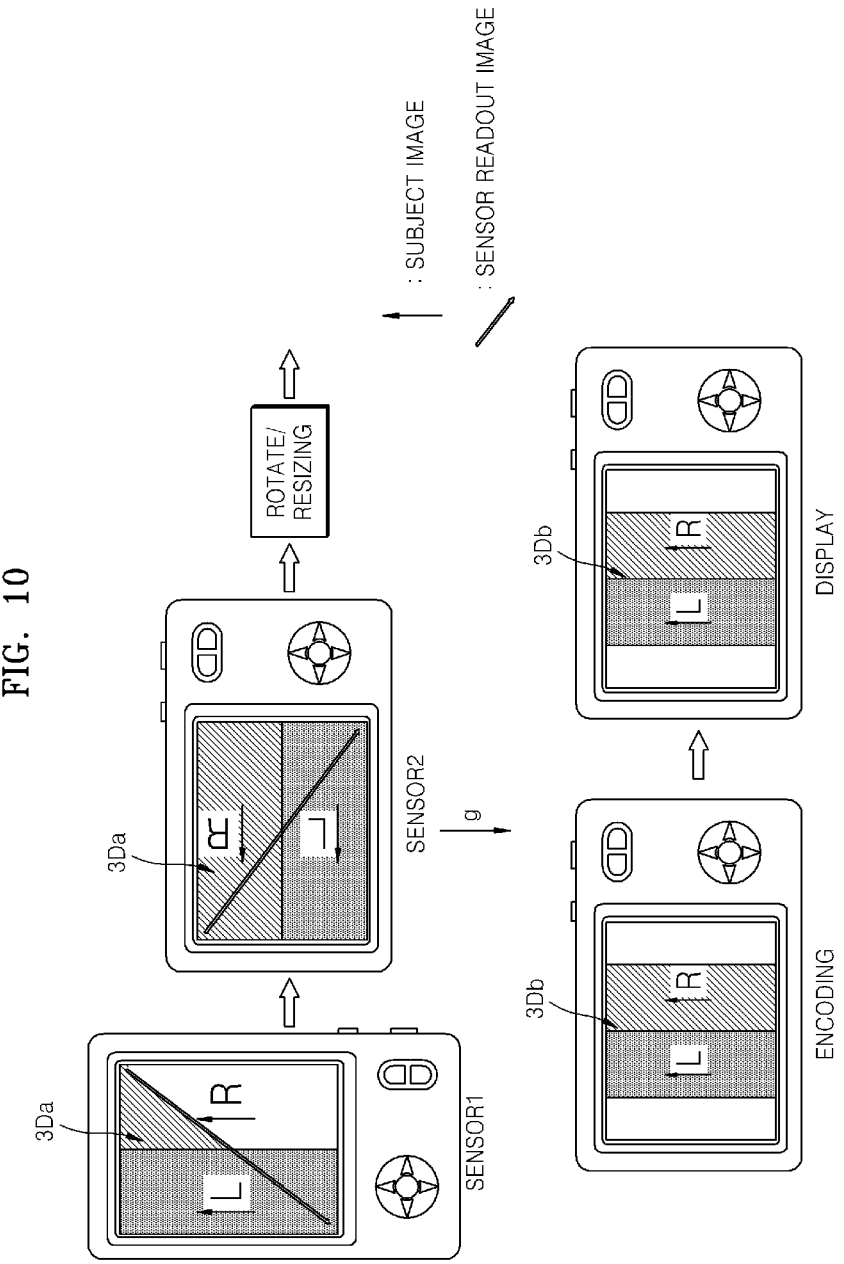
FIG. 10 is a diagram for describing a case where a stereoscopic image is generated by a sensor, read, compressed, and displayed when the digital camera is vertically positioned, as shown in FIG. 9, according to an embodiment of the invention.

FIG. 10 is a diagram for describing a case where a stereoscopic image 3D is generated by a sensor, read, compressed, and displayed when the digital camera is vertically positioned, as shown in FIG. 9, according to an embodiment of the invention.

In detail, with reference to FIG. 10 together with FIGS. 4 through 6, when the digital camera is vertically positioned in order to capture an image, the left image L and the right image R may be generated on a sensor 1 of a first arrangement through the first region 20a and the second region 20b of the shutter unit 20, respectively. Although the digital camera is vertically positioned, that is, although an arrangement of the sensor is changed, in other words, although a readout direction of the sensor is changed to a readout direction as shown in FIG. 10, the shutter unit 20 may be divided into the first region 20a and the second region 20b based on the gravity direction g. That is, according to the arrangement of the digital camera, the shutter unit 20 may be rotated based on the gravity direction g. According to electrical control, the digital camera may be divided into the first region 20a and the second region 20b based on the gravity direction g. This will be described with reference to FIGS. 12 through 16.

According to the present embodiment, although the arrangement of the digital camera is changed (i.e., is vertical), the left image L and the right image R in which the subject is positioned in the right direction (↑). Thus, a difference between right and left views may be generated, and a stereoscopic image 3Da may be generated using the left image L and the right image R.

When the digital camera is horizontally positioned, the left image L and the right image R in which the subject is positioned in a different direction (←) are formed on a sensor 2 of a second arrangement. A rotation unit and a resizing unit may rotate the stereoscopic image 3Da and may convert the left image L and the right image R in which the subject is positioned in the different direction (←) into the left image L and the right image R in which the subject is positioned in the right direction (↑). In this case, according to the size of the display unit, sizes of the left image L and the right image R may be further adjusted. Thus, the rotated stereoscopic image 3Db may be encoded and stored, and may be displayed on the display unit.

Figure 11:
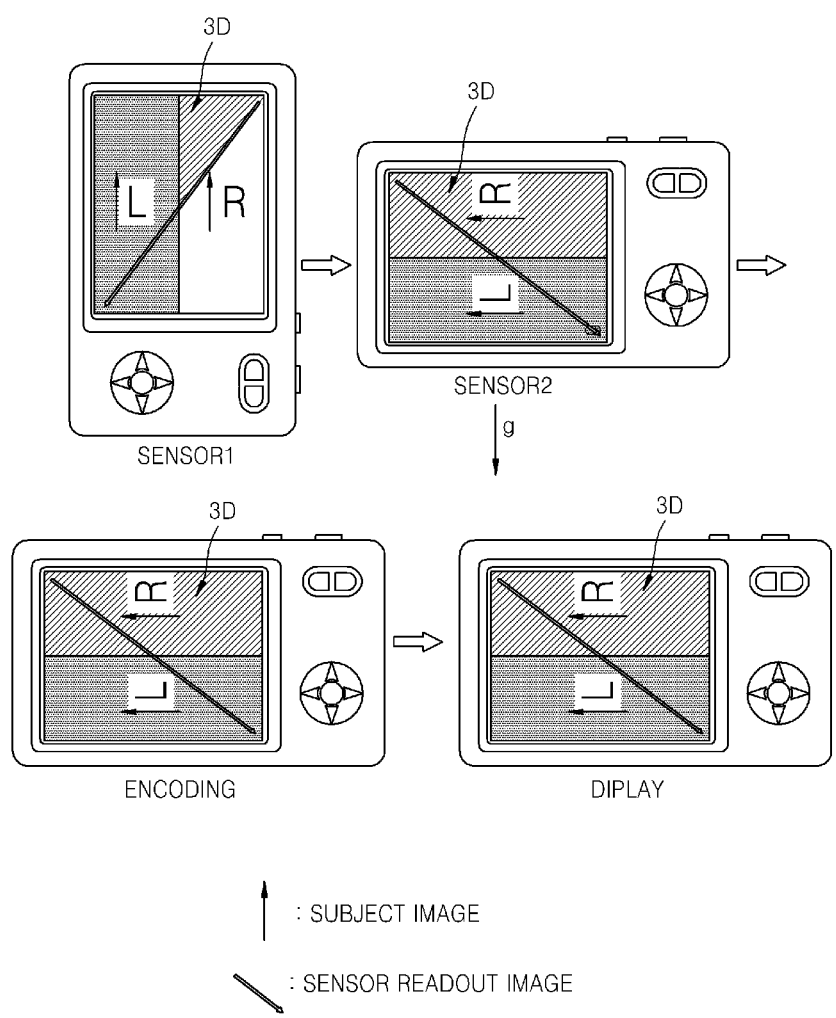
FIG. 11 is a diagram for describing a case where a stereoscopic image is generated by a sensor, read, compressed, and displayed when the digital camera is vertically positioned, as shown in FIG. 9, according to another embodiment of the invention.

In FIG. 11, the stereoscopic image 3Da in which the subject is positioned in the different direction (←) is encoded, stored, and displayed without rotating the stereoscopic image 3Da of FIG. 10. If necessary, the stored stereoscopic image 3Da may be rotated and may be displayed on the display unit. The stereoscopic image 3Da may be rotated and may be displayed on an external display unit.

Hereinafter, a case where an optical path shutting operation is performed when the shutter unit 20 is divided into a first region and a second region based on a gravity direction will be described.

As an example, the shutter unit 20 is divided into the first region 20a and the second region 20b based on the gravity direction.

Figure 12:
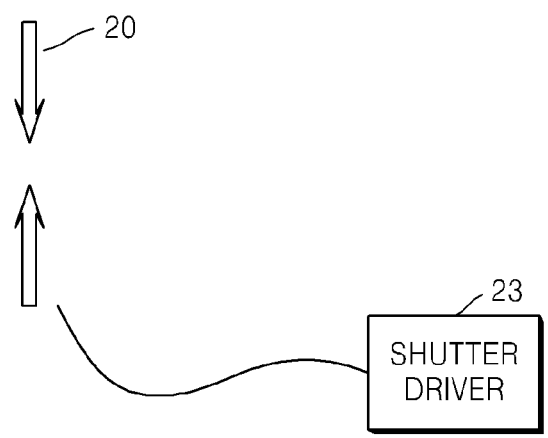
FIG. 12 is a diagram for describing a shutter unit and a shutter driver, in a stereoscopic image photographing apparatus, according to an embodiment of the invention.

Referring to FIG. 12, the shutter unit 20 may be driven by a shutter driver 23 so as to be divided into the first region 20a and the second region 20b based on the gravity direction, regardless of an orientation of the digital camera.

Figure 13:
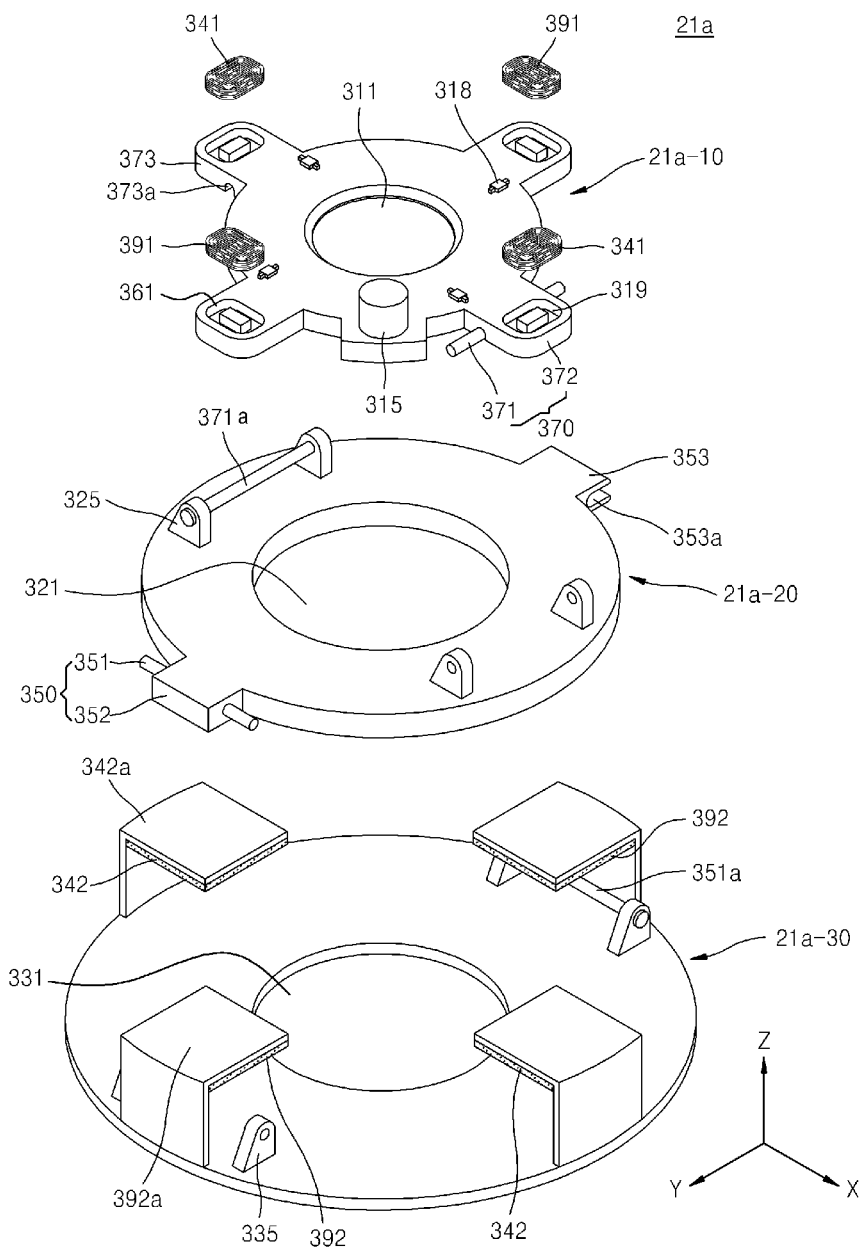
FIGS. 13 and 14 are diagrams for describing a shutter unit in a stereoscopic image photographing apparatus, according to an embodiment of the invention.
Figure 14:
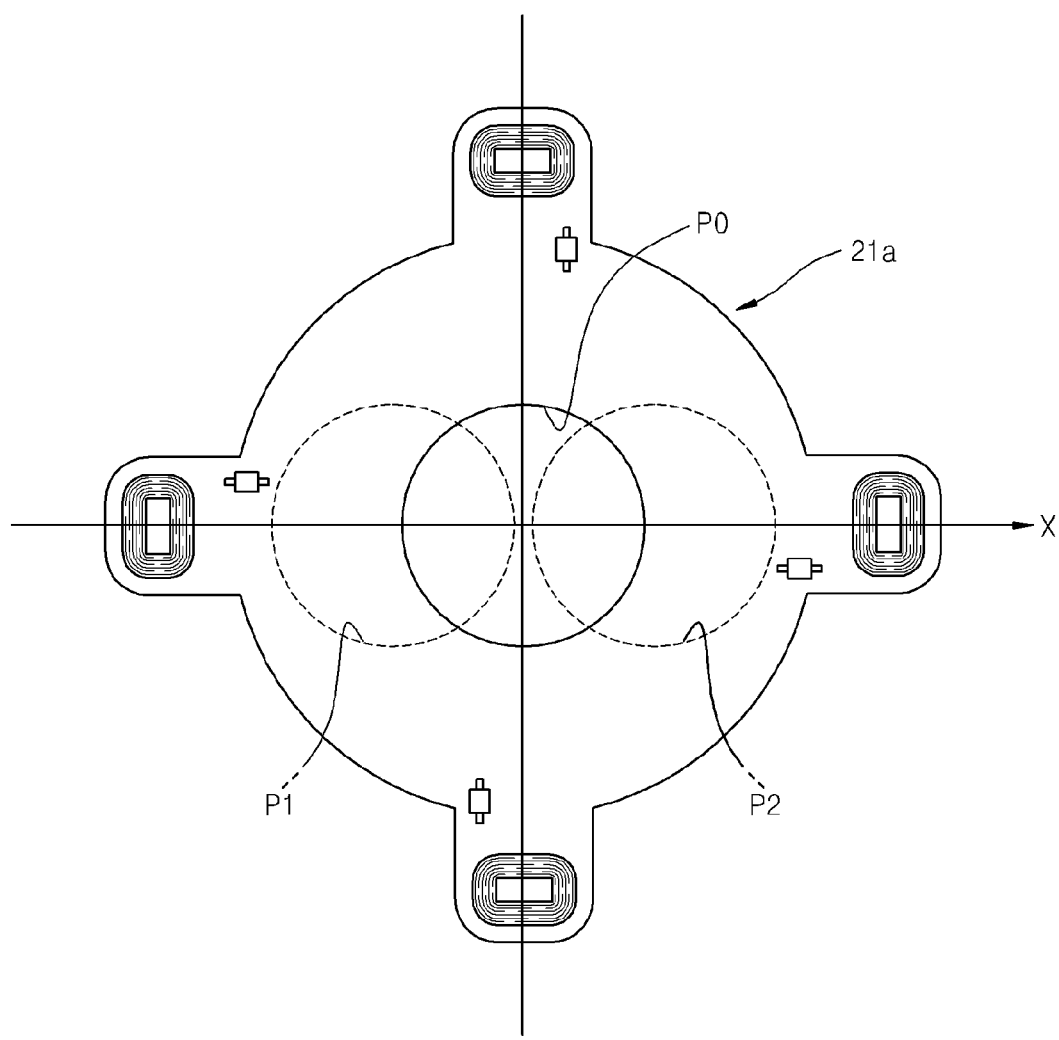

FIG. 13 is an exploded view of a shutter unit 21a driven by an electromagnetic force, according to an embodiment of the invention. FIG. 14 is a cross-sectional view for describing an operation of the shutter unit 21a of FIG. 13, according to an embodiment of the invention. The shutter unit 21a may be used to implement the shutter 20 of FIG. 1.

Referring to FIGS. 13 and 14, the shutter unit 21a includes a support plate 21a-30 including a first through hole 331 through which light is transmitted, a first slider 21a-20 that is coupled to the support plate 21a-30 so as to linearly move along a first direction (i.e., an X-axis direction), first drivers 391 and 392 for generating a driving force for moving the first slider 21a-20, and an iris unit 21a-10 having a diaphragm 311 and that is moveably coupled to the first slider 21a-20 along a second direction (i.e., a Y-axis direction) crossing the first direction and adjusting an optical amount.

The first slider 21a-20 includes a second through hole 321 corresponding to the first through hole 331, and is slidably coupled to the support plate 21a-30 wherein a linear guiding unit 350 including a rail 351 and first and second sliding blocks 352 and 353 is interposed between the first slider 21a-20 and the support plate 21a-30. The second sliding block 353 includes an open groove 353a having an open side for convenience of assembly with a rail 351a of the support plate 21a-30. The support plate 21a-30 includes stoppers 335 for restricting movement of two ends of the rails 351 and 351a.

The iris unit 21a-10 is driven by a driver 315 and moves so as to adjust an amount of light transmitted through the first through hole 331 and the second through hole 321. The iris unit 21a-10 is slidably coupled to the first slider 21a-20, wherein a linear guiding unit 370 including a rail 371 slidably coupled to a first sliding block 372, and a second sliding block 373 is interposed between the iris unit 21a-10 and the first slider 21a-20. An open groove 373a having an open side is formed in a bottom surface of the second sliding block 373 for convenience of assembly with a rail 371a of the first slider 21a-20. The first slider 21a-20 includes stoppers 325 for restricting two ends of the rails 371 and 371a.

The first drivers 391 and 392 include first coils 391 disposed on the iris unit 21a-10, and first magnet units 392 installed in brackets 392a of the support plate 21a-30 so as to correspond to the first coils 391. A desired attraction or repulsive force may act between the first coils 391 and the first magnet units 392 by controlling a current supplied to the first coils 391. Thus, a force applied to the iris unit 21a-10 is transferred to a first slider 21a-20 so that the first slider 21a-20 may move on the support plate 21a-30 along the X-axis.

Second drivers 341 and 342 include second coils 341 disposed on the iris unit 21a-10, and second magnet units 342 installed in brackets 342a of the support plate 21a-30 so as to correspond to the second coils 341. As in the case of the first drivers 391 and 392, a desired attraction or repulsive force may act between the second magnet units 342 and the second coils 341 by controlling a current value supplied to the second coils 341. Thus, the iris unit 21a-10 may move on the first slider 21a-20 along the Y-axis.

The iris unit 21a-10 may include detectors 318 for detecting a relative position of the iris unit 21a-10 with respect to the support plate 21a-30. The detector 318 may have a Hall sensor in which an induced current (or a voltage) varies according to an intensity of a magnetic field.

As shown in FIG. 13, the drivers 341 and 391 may be positioned in recesses 319 and 361, respectively, formed in the iris unit 21a-10.

The first drivers 391 and 392 and the second drivers 341 and 342 are not limited to the above-described structures, and may have various forms. For example, the first coils 391 may be installed on the first slider 21a-20, and the first slider 21a-20 may be moved by a magnetic force acting between the first magnet portions 392 and the first coils 391. Alternatively, magnetic portions may be disposed on the iris unit 21a-10, and coils may be disposed on the support plate 21a-30.

FIG. 14 is a plan view for explaining a first operational state of the shutter unit 21a of FIG. 13, according to an embodiment of the invention.

In detail, with reference to FIGS. 13 and 14, the iris unit 21a-10 may selectively move in the first direction (i.e., the X-axis direction) or the second direction (i.e., the Y-axis direction). FIG. 14 shows the first operational state in which the iris unit 21a-10 moves in the X-axis direction by supplying a current to the first coils 391. The first operational state may correspond to, for example, a horizontal photographing state in which a photographing apparatus is positioned parallel to the ground. In this case, the Y-axis direction corresponds to the gravity direction g. When the iris unit the iris unit 21a-10 is in an original position P0 in which a center of the iris unit 21a-10 matches an optical axis, a two-dimensional image may be obtained.

In a three-dimensional photographing mode and when the digital camera is positioned horizontally, a three-dimensional image may be obtained by capturing a first image when the iris unit 21a-10 is moved left along the X-axis direction to a first position P1, and by capturing a second image when the iris unit 310 is moved right along the X-axis direction to a second position P2.

Likewise, when the digital camera is positioned vertically, the shutter unit 21a is in a second operational state in which the iris unit 21a-10 moves in the Y-axis direction by supplying a current to the second coils 341. In this case, the X-axis direction corresponds to the gravity direction g. Accordingly, a three-dimensional image may be obtained by capturing a first image when the iris unit 21a-10 is moved in a first direction along the Y-axis to a first offset position, and by capturing a second image when the iris unit 310 is moved the opposite along the Y-axis to a second offset position. Thus, the example shutter unit 21a may be used to capture left and right images regardless of the orientation of the digital camera.

Although not illustrated, according to one or more embodiments of the invention, a power unit for supplying a current to coils of the shutter unit 21a may be used as a shutter driver.

So far, a path of optical signal of a desired region is shut by moving the iris unit 21a-10 using an electromagnetic force, but embodiments of the invention are not limited thereto. For example, an iris unit may be moved using a saw-tooth method, a sliding method, or the like.

Figure 15:
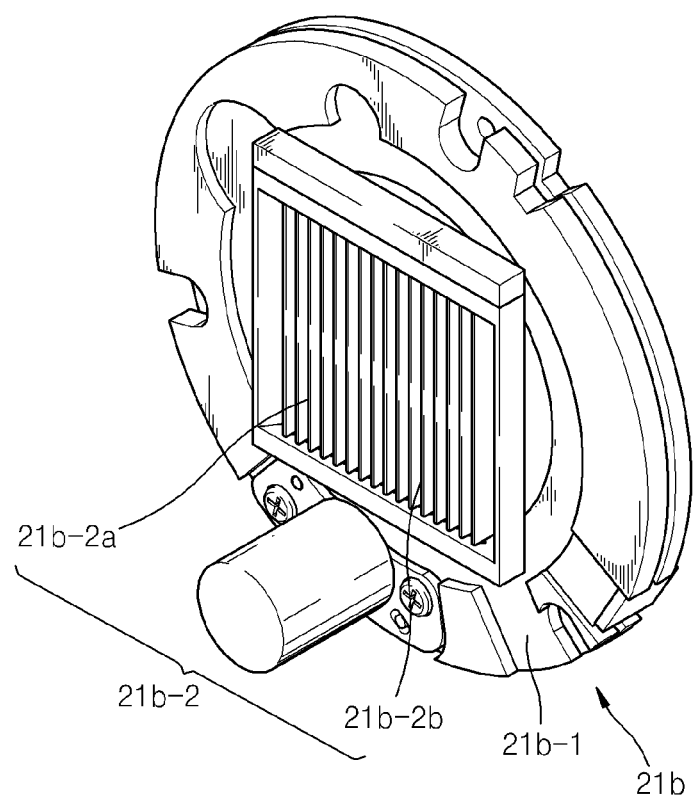
FIGS. 15 and 16 are diagrams for describing a shutter unit in a stereoscopic image photographing apparatus, according to another embodiment of the invention.
Figure 16:
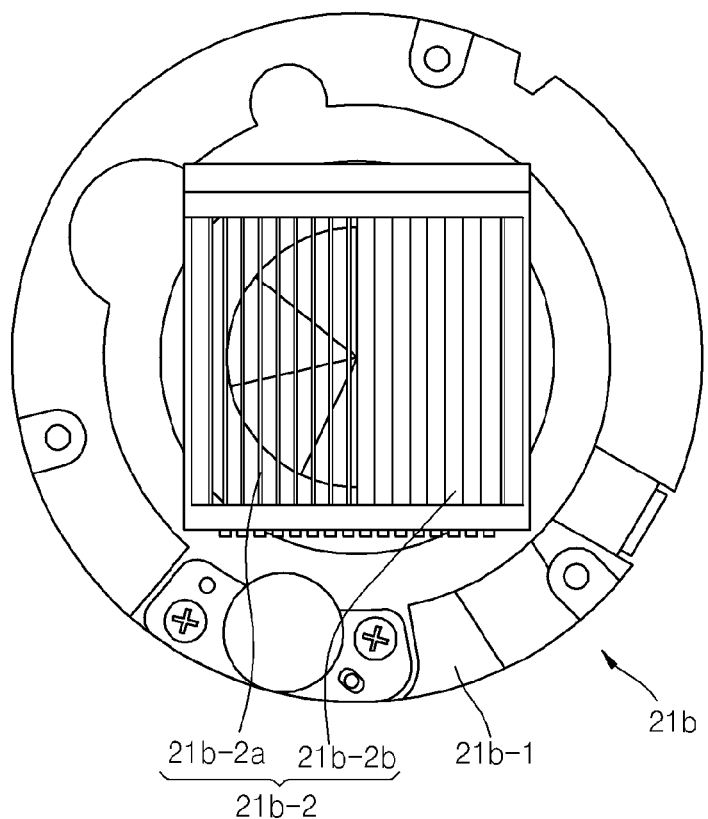

FIGS. 15 and 16 are a perspective view and a plan view of a shutter unit 21b, according to an embodiment of the invention. The shutter unit 21b may be used to implement the shutter unit 20 of FIG. 1.

According to the present embodiment, the shutter unit 21b includes a blind shutter 21b-2 including a left side 21b-2a and the right side 21b-2b that are divided with respect to a central axis is disposed on an iris unit 21b-1 including a central through hole. The iris unit 21b-1 may, for example, be the example iris unit 21a-10 of FIG. 13.

The blind shutter 21b-2 may rotate so as to be derived into the left side 21b-2a and a right side 21b-2b based on the gravity direction g, regardless of an orientation of a digital camera.

Referring to FIG. 16, a left image may be generated in an imaging device by opening the left side 21b-2a and closing the right side 21b-2b. A right image may be generated in the same way. A stereoscopic image may be generated using a difference between right and left views on the same subject by alternately displaying the right image and the left image.

Although not illustrated, according to the present embodiment, a shutter driver may include a first driver for driving rotation of the blind shutter 21b-2 and a second driver for controlling opening/closing of the blind shutter 21b-2.

Figure 17:
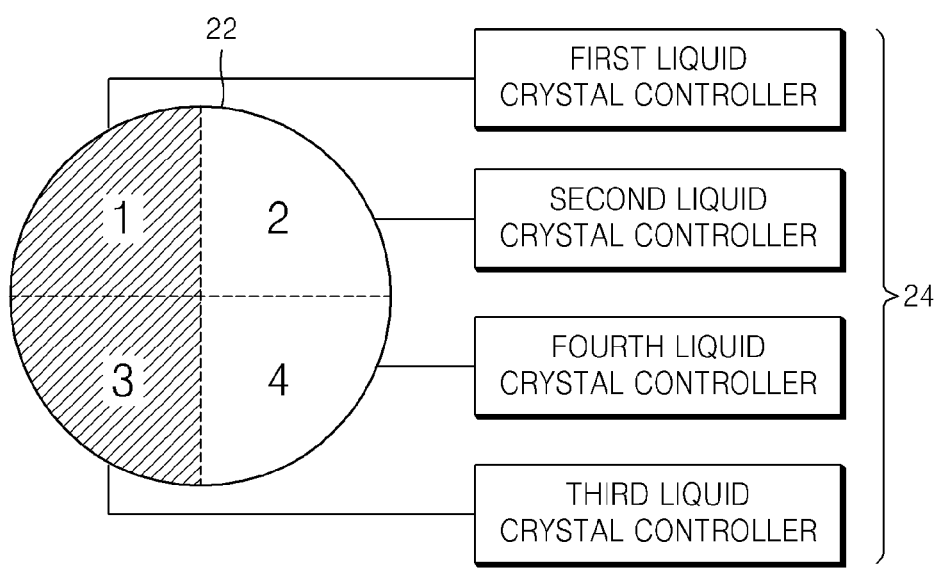
FIG. 17 is a diagram for describing a shutter unit in a stereoscopic image photographing apparatus, according to another embodiment of the invention.

FIG. 17 shows a shutter unit 22 that is electrically controlled in a stereoscopic image photographing apparatus, according to an embodiment of the invention. The shutter unit 22 may be used to implement the shutter unit 20 of FIG. 1.

Referring to FIG. 17, the shutter unit 22 is a liquid crystal shutter, and is divided into a plurality of regions 1, 2, 3, and 4. Respective liquid crystal controllers 24 are used for controlling an arrangement of liquid crystals of each of the regions 1, 2, 3, and 4. For example, when a position detector (e.g., the position detector 50 of FIG. 1) detects that a digital camera is horizontally positioned, the shutter unit 22 may simultaneously shut a path of an optical signal of the first region 1 and the third region 3, which correspond to the position P1 of FIG. 14, or may simultaneously shut a path of an optical signal of the second region 2 and the fourth region 4, which correspond to the position P2 of FIG. 14. When the position detector detects that the digital camera is vertically positioned, the shutter unit 22 may simultaneously shut the path of the optical signal of the first region 1 and the second region 2, which correspond to an offset of the iris unit 21a in the Y-direction, or simultaneously may shut the path of the optical signal of the third region 3 and the fourth region 4, which correspond to an opposite offset of the iris unit 21a in the Y-direction. When the shutter unit 22 is vertically positioned, the third region 3 and the fourth region 4 are disposed in a left side, and the first region 1 and the second region 2 are disposed in a right side based on the gravity direction g.

Thus, the shutter unit 22 may shut the path of the optical signal in both the first region 20a and the second region 20b regardless of an orientation of the digital camera, and a left image and a right image having a difference between right and left views based on a subject with a right direction may be obtained, thereby generating a stereoscopic image.

According to one or more embodiments of the invention, a stereoscopic image photographing apparatus includes a shutter unit including a first region and a second region that are divided based on a gravity direction as an absolute basis regardless of an orientation of the stereoscopic image photographing apparatus.

Thus, a left image and a right image having a difference between right and left views based on a subject with a right direction may be obtained, thereby generating a stereoscopic image, regardless of an arrangement of the digital camera.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

The embodiments described herein may comprise a memory for storing program data, a processor for executing the program data, a permanent storage such as a disk drive, a communications port for handling communications with external devices, and user interface devices, including a display, keys, etc. When software modules are involved, these software modules may be stored as program instructions or computer-readable codes, which are executable by the processor, on a non-transitory or tangible computer-readable media such as read-only memory (ROM), random-access memory (RAM), a compact disc (CD), a digital versatile disc (DVD), magnetic tapes, floppy disks, optical data storage devices, an electronic storage media (e.g., an integrated circuit (IC), an electronically erasable programmable read-only memory (EEPROM), and/or a flash memory), a quantum storage device, a cache, and/or any other storage media in which information may be stored for any duration (e.g., for extended time periods, permanently, brief instances, for temporarily buffering, and/or for caching of the information). The computer-readable recording medium can also be distributed over network-coupled computer systems (e.g., a network-attached storage device, a server-based storage device, and/or a shared network storage device) so that the computer-readable code may be stored and executed in a distributed fashion. This media can be read by the computer, stored in the memory, and executed by the processor. As used herein, a computer-readable storage medium excludes any computer-readable media on which signals may be propagated. However, a computer-readable storage medium may include internal signal traces and/or internal signal paths carrying electrical signals therein.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

What is claimed is:

1. A stereoscopic image photographing apparatus comprising:
    an optical unit to receive an optical signal representing a subject;
    a shutter unit to alternately shut a path of the optical signal in accordance with a first region and a second region; and
    an imaging unit to generate a first image signal by converting a first optical signal transmitted through the first region, and to generate a second image signal by converting a second optical signal transmitted through the second region,
    wherein the shutter unit divides the path of the optical signal into the first region and the second region that are oriented relative to the photographing apparatus based on an orientation of the photographing apparatus relative to the earth gravity direction, and
    wherein the first and second shutter regions change their orientation relative to the photographic apparatus when the orientation of the photographic apparatus relative to the earth gravity direction is changed.

2. The stereoscopic image photographing apparatus of claim 1, wherein the first region is a left region based on the gravity direction, and
    wherein the second region is a right region based on the gravity direction.

3. The stereoscopic image photographing apparatus of claim 1, wherein a first image of the first image signal and a second image of the second image signal have a difference between right and left views of a subject based on the gravity direction.

4. The stereoscopic image photographing apparatus of claim 1, further comprising an image signal processor to read the first image signal and the second image signal from the imaging unit so as to perform image-signal processing on the first image signal and the second image signal.

5. The stereoscopic image photographing apparatus of claim 4, wherein the image signal processor comprises a rotation processor to, when at least one of a first image of the first image signal and a second image of the second image signal is not positioned in a right direction based on a readout direction, rotate the at least one of the first image of the first image signal and the second image of the second image signal so that a subject is positioned in the right direction.

6. The stereoscopic image photographing apparatus of claim 5, wherein the subject of the first image and the second image have a difference between right and left views based on the gravity direction.

7. The stereoscopic image photographing apparatus of claim 4, further comprising a display unit to display a stereoscopic image comprising the first image and the second image.

8. The stereoscopic image photographing apparatus of claim 4, further comprising a position detector to detect an orientation of the stereoscopic image photographing apparatus relative to the gravity direction.

9. The stereoscopic image photographing apparatus of claim 1, wherein the shutter unit comprises a shutter divided into the first region and the second region based on a central axis, and a shutter driver to drive the shutter so that the first region and the second region are divided based on the gravity direction.

10. The stereoscopic image photographing apparatus of claim 9, wherein the shutter comprises a blind-type shutter.

11. The stereoscopic image photographing apparatus of claim 9, further comprising a position detector to detect a position of the stereoscopic image photographing apparatus, and
wherein the shutter driver drives the shutter so that the first region and the second region are divided based on the gravity direction according to the position detected by the position detector.

12. The stereoscopic image photographing apparatus of claim 1, wherein the shutter unit comprises:
a liquid crystal unit to shut the path of the optical signal according to an arrangement of liquid crystals;
a liquid crystal controller to control the arrangement of the liquid crystals with respect to the first region and the second region of the liquid crystal unit, which are divided based on the gravity direction.

13. The stereoscopic image photographing apparatus of claim 12, further comprising a position detector to detect a position of the stereoscopic image photographing apparatus,
wherein the liquid crystal controller is to control the arrangement of the liquid crystals with respect to both the first region and the second region of the liquid crystal unit based on the gravity direction when the position detected by the position detector is changed.

14. A method of capturing a stereoscopic image, the method comprising:
detecting an orientation of a stereoscopic image photographing apparatus;
dividing an optical path of the stereoscopic image photographing apparatus into first and second shutter regions that are oriented relative to the photographing apparatus based on the orientation of the photographing apparatus relative to the gravity direction, and
changing the orientation of the first and second shutter regions relative to the photographic apparatus when the orientation of the photographic apparatus relative to the earth gravity direction is changed;
alternately shutting portions of the optical path in accordance with the first and second regions;
generating a first image signal by converting a first optical signal transmitted through the first region; and
generating a second optical signal by converting a second optical signal transmitted through the second region.

15. The method of claim 14, wherein the stereoscopic image comprises the first image and the second image.

16. The method of claim 14, further comprising when at least one of a first image of the first image signal or a second image of the second image signal is not positioned in a right direction based on a readout direction, rotating the at least one of the first image or the second image so that a subject is positioned in the right direction.

17. The method of claim 14, wherein dividing the optical path of the stereoscopic image photographing apparatus into the first and second regions comprises selecting portions of a liquid crystal unit based on the orientation relative to the gravity direction.

18. The method of claim 14, wherein dividing the optical path of the stereoscopic image photographing apparatus into the first and second regions comprises rotating a blind shutter.

19. The method of claim 14, wherein shifting an iris along the axis comprises shifting the iris along a first axis when the stereoscopic image photographing apparatus is in a first orientation and shifting the iris along a second axis when the stereoscopic image photographing apparatus is in a second orientation.

20. The method of claim 14, wherein alternately shutting the portions of the optical path in accordance with the first and second regions comprises shifting an iris along an axis perpendicular to the gravity direction.

* * * * *